(12) United States Patent
Hottovy et al.

(10) Patent No.: US 7,015,289 B2
(45) Date of Patent: Mar. 21, 2006

(54) PROCESS AND APPARATUS FOR REDUCING TAKE-OFF VALVE PLUGGING IN A POLYMERIZATION PROCESS

(75) Inventors: John D. Hottovy, Bartlesville, OK (US); Dale A. Zellers, Bartlesville, OK (US); Randy L. Hagenson, Humble, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 91 days.

(21) Appl. No.: 10/660,824

(22) Filed: Sep. 12, 2003

(65) Prior Publication Data

US 2004/0158007 A1 Aug. 12, 2004

Related U.S. Application Data

(60) Provisional application No. 60/410,672, filed on Sep. 13, 2002.

(51) Int. Cl.
*C08F 2/12* (2006.01)
(52) U.S. Cl. .......................................... 526/64; 526/88
(58) Field of Classification Search ................. 526/64, 526/88
See application file for complete search history.

(56) References Cited

U.S. PATENT DOCUMENTS

| 3,556,730 | A | * | 1/1971 | Mitacek | 436/85 |
| 4,007,321 | A | | 2/1977 | Scholz et al. | 526/64 |
| 4,211,863 | A | | 7/1980 | McDaniel et al. | 528/483 |
| 4,257,533 | A | * | 3/1981 | Matsuyama et al. | 222/1 |
| 5,180,558 | A | | 1/1993 | Takakarhu | 422/131 |
| 5,183,866 | A | | 2/1993 | Hottovy | 526/88 |
| 5,387,659 | A | | 2/1995 | Hottovy et al. | 526/59 |
| 5,455,314 | A | | 10/1995 | Burns et al. | 326/61 |
| 5,565,174 | A | | 10/1996 | Burns et al. | 422/131 |
| 5,565,175 | A | | 10/1996 | Hottovy et al. | 422/132 |
| 6,042,790 | A | | 3/2000 | Hottovy et al. | 422/131 |
| 6,239,235 | B1 | | 5/2001 | Hottovy et al. | 526/64 |
| 6,262,191 | B1 | | 7/2001 | Hottovy et al. | 526/64 |
| 6,380,325 | B1 | | 4/2002 | Kendrick | 526/64 |

OTHER PUBLICATIONS

The American Heritage Dictionary (2d ed), Houghton Mifflin, Boston, p. 923 (1982).*

* cited by examiner

*Primary Examiner*—Fred Teskin
(74) *Attorney, Agent, or Firm*—Fletcher Yoder

(57) ABSTRACT

A slurry polymerization process removes a portion of the fluid slurry without using a settling leg or a continuous take-off. The process uses a reactor take-off valve that is periodically fully closed and fully opened such that the withdrawn slurry is removed from the reactor in a discontinuous manner. The regular, periodic full closing and full opening of the take-off valve reduces instances of polymer plugging the take-off valve. In another aspect of the invention, a take-off valve is throttled in a repetitive pattern to reduce plugging of the take-off valve.

18 Claims, 4 Drawing Sheets

US 7,015,289 B2

PROCESS AND APPARATUS FOR REDUCING TAKE-OFF VALVE PLUGGING IN A POLYMERIZATION PROCESS

RELATED APPLICATIONS

This application claims the benefit under 35 U.S.C. § 119(e) of U.S. Provisional Application No. 60/410,672 ("the '672 application") filed on Sep. 13, 2002. The '672 application is incorporated by reference herein.

FIELD OF THE INVENTION

This invention relates to the slurry polymerization of olefin monomers in a liquid medium. More particularly, this invention relates to techniques for withdrawing a portion of the slurry from the polymerization reaction zone.

BACKGROUND OF THE INVENTION

Polyolefins such as polyethylene and polypropylene may be prepared by particle form polymerization, also referred to as slurry polymerization. In this technique, feed materials such as diluent, monomer and catalyst are introduced to a reaction zone (for example, a loop reaction zone), and a fluid slurry containing solid polyolefin particles, diluent, and unreacted monomer is circulated through the loop reaction zone.

In continuous loop reactors, the various feed materials may be introduced to the loop reaction zone in various ways. For example, the monomer and catalyst may be mixed with varying amounts of diluent prior to introduction to the loop reaction zone. In the loop reaction zone, the monomer and catalyst become dispersed in the fluid slurry. As the fluid slurry circulates through the loop reaction zone, the monomer reacts at the catalyst in a polymerization reaction. The polymerization reaction yields solid polyolefin particles in the fluid slurry.

Slurry polymerization in a loop reaction zone has proven commercially successful. The slurry polymerization technique has enjoyed international success with billions of pounds of olefin polymers being so produced annually. With this success has come the desirability, in some circumstances, of building a smaller number of large reactors as opposed to a larger number of small reactors for a given plant capacity.

Larger reactors lead to larger flow rates of fluid slurry. The flow rate inside a loop reactor can range typically from 15,000 gallons (56,781 liters) per minute to 1,000,000 gallons (3,785,410 liters) per minute or more.

Conventional polymerization processes may utilize continuous take-off or traditional settling legs for removing fluid slurry from the reactor. In a polymerization process utilizing continuous take-off, the withdrawn slurry may be continuously removed through a take-off appendage.

The withdrawn slurry is usually a small portion of the fluid slurry that is in a loop reaction zone. The flow of this smaller withdrawn slurry typically ranges from 50 gallons (189 liters) per minute to 3000 gallons (11,356 liters) per minute. The large flow in the reactor can transport polymer in the form of slurry particles that are small, for example, a size distribution of slurry particles in which 99% are less than 0.1 inch in nominal diameter, but also larger polymer particles or fused chunks of polymer that can range in size from 0.1 inch up to the internal diameter of the reactor, typically 24 inches or so.

The larger polymer chunks or particles, with diameters larger than the take-off valve control opening, may plug the take-off valve. When such larger particles attempt to pass through the take-off valve, either the particle breaks or the control valve is restricted in flow.

Flow restriction causes loss of flow through the take-off valve and may cause additional build-up of polymer particles, which can lead to plugging. Polymer build-up at the take-off valve causes the reactor pressure to increase, since the reactor pressure is usually controlled at least in part by the take-off valve opening. If the build-up in polymer particles is quicker than the action of the control mechanism for controlling pressure by opening the take-off valve, a plugged line and excessive reactor pressures result. This is especially severe for fused or a typical polymer chunks that can grow in the loop reactor that have a much larger dimension than the largest polymer particle size. Plugged reactor take-off valves can lead to reactor overpressure, downtime, production loss, and in extreme situations, relief of reactor pressure by process safety relief valves.

BRIEF SUMMARY OF THE INVENTION

One aspect of the invention includes a polymerization process comprising polymerizing in a loop reaction zone, at least one olefin monomer to produce a fluid slurry comprising a liquid medium and solid olefin polymer particles. A portion of the fluid slurry is withdrawn through a product take-off assembly, wherein the product take-off assembly does not include a slurry concentrator. The product take-off assembly is repetitively fully closed and opened at set intervals such that the withdrawn slurry is removed from the reactor in a discontinuous manner.

The take-off valve may be partially or fully opened at set intervals. For example, the take-off valve may operated at a baseline openness of from about 20% to about 60%, for example about 50%, and periodically fully open and fully close. Alternatively, the take-off valve is at least 60% open at set intervals. The set intervals for repetitively fully closing and opening the take-off valve can extend through substantially all of the polymerizing step or through some lesser portion of the polymerizing step.

Another aspect of the invention includes a polymerization process comprising polymerizing in a loop reaction zone, at least one olefin monomer to produce a fluid slurry comprising a liquid medium and solid olefin polymer particles. A portion of the fluid slurry is withdrawn through a product take-off assembly, wherein the product take-off assembly does not include a slurry concentrator. A take-off valve, which is provided as part of the product take-off assembly, is opened and closed (partially and/or fully) in a repetitive pattern.

In this process, the closing and opening may be done in a sine wave pattern or in a modified sine wave pattern. The modified sine wave pattern has a peak and a trough (as does the sine wave pattern), and the take-off valve can be fully closed at the trough of the modified sine wave pattern and fully open at the peak of the modified sine wave pattern.

In the each of the foregoing aspects, the take-off valve is preferably a ball valve. The processes can further comprise maintaining a concentration of the solid olefin polymer particles in the fluid slurry in the reaction zone of greater than 40 weight percent based on the weight of the olefin polymer particles and the weight of the liquid medium. The reaction zone can have a volume of greater than 20,000 gallons, alternatively a volume of greater than 30,000 gallons, alternatively a volume of greater than 35,000 gallons.

DETAILED DESCRIPTION OF THE INVENTION

Figure 1:
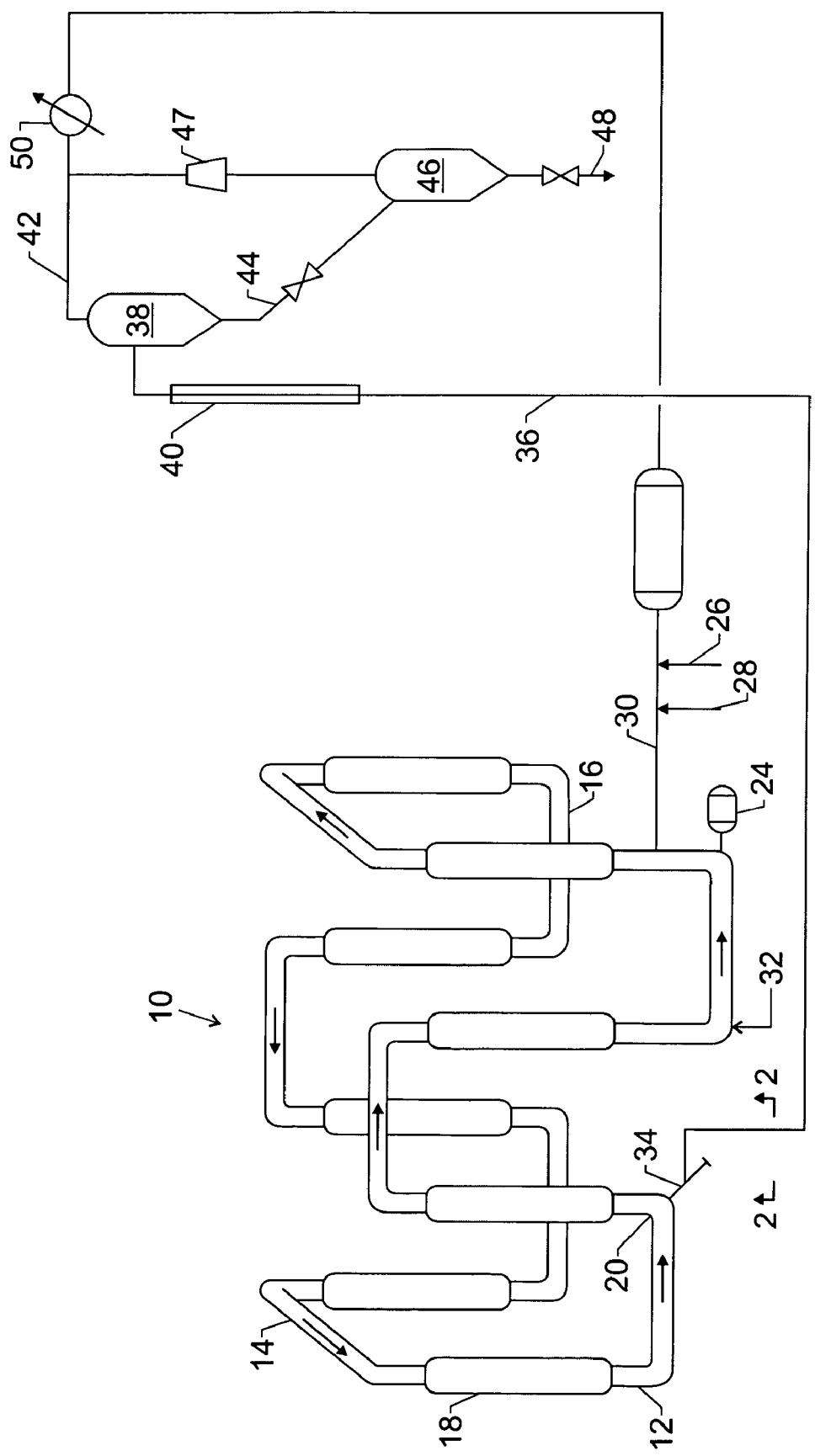
FIG. 1 is a view of a polymerization reaction system utilizing a loop reactor.

Polymerization reaction systems that use take-off valves that open and close are known in the art. Some systems are batch-type processes used to concentrate the slurry before it is withdrawn. Some systems involve multiple valves which open and close in sequence. In some systems, slurry concentrators are used to concentrate polymer slurry from a polymerization reactor before the concentrated slurry is withdrawn.

For example, one system includes polymerization in a pipe loop reactor with the product being taken off by use of settling legs, a type of slurry concentrator. Settling legs are generally containment devices, attached to the bottom of a reactor, in which solid polymer is allowed to settle or accumulate. The solid polymer, which is suspended in the liquid diluent, tends to settle in the settling legs, thereby making the polymer concentration of the slurry in the settling leg higher than that of the fluid slurry in the pipe loop reactor. The settling legs then periodically "dump" or "fire" accumulated polymer slurry through a take-off valve that operates in an on/off fashion. The "dumped" product slurry is then sent to downstream recovery systems. The "firing" of settling legs tends to cause variation in the average pressure of the loop reactor.

Batch take-off systems using settling legs present logistical problems as reactors get larger. If a pipe diameter is doubled, the volume of the reactor goes up four-fold. However, because of the valve mechanisms involved, the size of the settling legs cannot easily be increased further. Hence, as reactor size increases, the number of settling legs required may begin to exceed the physical space available.

Take-off systems have been introduced in which the fluid slurry in the polymerization reaction zone is maintained at a higher solids concentration, and withdrawn slurry is directly withdrawn from the reactor without the use of a settling leg or batch-type system. In such systems, a take-off assembly is used to continuously withdraw reaction effluent. Typically, the take-off assembly is a pipe usually the same diameter or nearly the same diameter as the flashline, or polymer recovery system downstream of the take-off valve. The pipe connects to an opening in the reactor where the majority of fluid slurry is flowing by it and removes a portion of this fluid slurry. The take-off valve is connected to the take-off assembly downstream of the reactor but upstream of the polymer recovery system. This type of take-off and recovery system allows for reactor volumes of greater than 20,000 gallons, alternatively 50,000 gallons, alternatively 100,000 gallons, and reactor solids concentrations of greater than 40 weight percent, alternatively greater than 45 weight percent, alternatively greater than 50 weight percent.

With larger reactor volumes and higher solids concentrations, one must continue to ensure that the take-off valve does not become plugged. Higher solids concentrations increase the chance of larger polymer particles or agglomerates in the fluid slurry and therefore increase the risk of take-off valve plugging. Larger reaction volumes increase the economic loss due to production loss as a result of valve plugging.

It has been discovered that fully closing and fully opening the take-off valve periodically and regularly is useful for reducing instances of plugging in the take-off valve. It has further been discovered that throttling (adjusting the amount of the valve opening) the reactor take-off valve in a repetitive pattern may also reduce in instances of take-off valve plugging. The repetitive pattern throttling may be accomplished by controlling the take-off valve with a controller that actuates the valve according to a particular signal, which may be provided as a repetitive pattern such as a sine wave.

The short localized pressure pulse created by the closing and opening of the take-off valve can prevent plugging of the take-off valve by forcing larger polymer chunks or particles or polymer build-up through the valve throat and/or by breaking up polymer accumulation. However, the duration and magnitude of the pressure pulse is not so large as to significantly affect the average pressure of the loop reactor. By fully closing and fully opening the take-off valve at regular intervals, regardless of the detection of actual plugging, the operator of the polymerization reactor can clear the take-off valve, ensure regular production of polymer and avoid plugging problems before they occur. This can be a manual or automatic function of the product take off system.

Further, fully opening the take-off valve on a regular basis gives the larger slurry polymer particles and chunks an opportunity to pass through the effluent line to downstream recovery systems. Systems that throttle the valve in response to set pressure points may not achieve a full open position often enough, or quickly enough, to allow larger particles or accumulation to pass. Regular maximization of the take-off valve throughput reduces the chances that larger polymer particles will plug the take-off valve and reduces the chance of polymer particle build-up or accumulation at the valve intake.

Further, the advantages of the localized pressure pulse created by the full closing and full opening of the take-off valve and the regular maximization of the take-off valve throughput can be combined by fully closing and fully opening the take-off valve at consistent regular intervals.

In another aspect of the present process and apparatus, a reactor take-off valve is throttled in a repetitive pattern. The repetitive pattern throttling may be accomplished by closing and opening the take-off valve with a controller according to a particular signal, which may be provided as a repeating function, such as a sine wave. The control system could be configured to put the valve at its full open position at the peak of the wave and at its most restricting position (lowest flow) at the trough of the wave. With such a system, larger particles or agglomerates can pass through the valve during the peak of the sine wave while reactor pressure control and less flow is maintained during the low part of the sine wave. The repetitive pattern throttle ensures that the valve will experience good throughput on a regular basis, thereby providing regular opportunities to pass larger particles or agglomerates of polymer as in the close/open control figuration previously described. Any suitable pattern, such as a saw tooth, would be acceptable. Further, a random pattern, such as where frequency and amplitude are controlled randomly around a desired normal value, would also be useful.

An aspect of the invention has a reaction system and a withdrawn slurry take-off system. The reaction system can house any olefin polymerization in a loop reactor that produces a fluid slurry of solid particles polymer and liquid medium. Suitable olefin monomers are 1-olefins having up to 8 carbon atoms per molecule and no branching nearer the double bond than the 4-position. The present polymerization process is particularly suitable for the homopolymerization of ethylene and the copolymerization of ethylene and a higher 1-olefin such as butene, 1-pentene, 1-hexene, 1-octene or 1-decene. Especially preferred is ethylene and 0.01 to 10, preferably 0.01 to 5, most preferably 0.1 to 4, weight percent higher olefin based on the total weight of ethylene and comonomer. Alternatively sufficient comonomer can be used to give the above-described amounts of comonomer incorporation in the polymer.

Suitable diluents (as opposed to solvents or monomers) are well known in the art and include hydrocarbons that are inert and liquid under reaction conditions. Suitable hydrocarbons include isobutane, propane, n-pentane, i-pentane, neopentane and n-hexane, with isobutane being especially preferred. The liquid medium may be a diluent for the solid polymer particles, which is separate from and in addition to the unreacted monomer.

The present processes and apparatus may also be used for propylene polymerization in loop reactors. In the case of bulk polymerization of propylene, there is no separate diluent with respect to the monomer, because the monomer (propylene) serves as the liquid medium. However, a liquid medium that is a diluent for the catalyst will be used for catalyst slurry preparation in the present process and apparatus. Also, in the case of propylene polymerization, the comonomer can be ethylene and/or another comonomer.

Suitable catalysts are well known in the art. Particularly suitable is chromium oxide on a support such as silica as broadly disclosed, for instance, in Hogan and Banks, U.S. Pat. No. 2,825,721 (March 1958), the disclosure of which is hereby incorporated by reference. Ziegler catalysts, metallocenes, and other well-known polyolefin catalysts, as well as co-catalysts, may be used.

Referring now to the drawings, FIG. 1 shows a loop reactor 10 having vertical segments 12, upper horizontal segments 14 and lower horizontal segments 16. These upper and lower horizontal segments define upper and lower zones of horizontal flow. In FIG. 1, the loop reactor has eight vertical segments, although it is contemplated that the present process may be used with a loop reactor having a higher or lower number of vertical segments. The reactor is cooled by means of two pipe heat exchangers formed by a pipe and jacket. The reactor is typically a pipe loop reactor with an inner diameter of from about 4 inches to about 48 inches.

Each segment or leg is connected to the next segment or leg by a smooth bend or elbow 20 thus providing a continuous flow path substantially free from internal obstructions. The fluid slurry is circulated by means of impeller (not shown) driven by a motor 24. Monomer, comonomer, if any, and make up diluent are introduced via lines 26 and 28 respectively which can enter the reactor directly at one or a plurality of locations or can combine with condensed diluent recycle line 30 as shown. Catalyst is introduced via catalyst introduction means 32, which provides a zone (location) for catalyst introduction.

Figure 2:
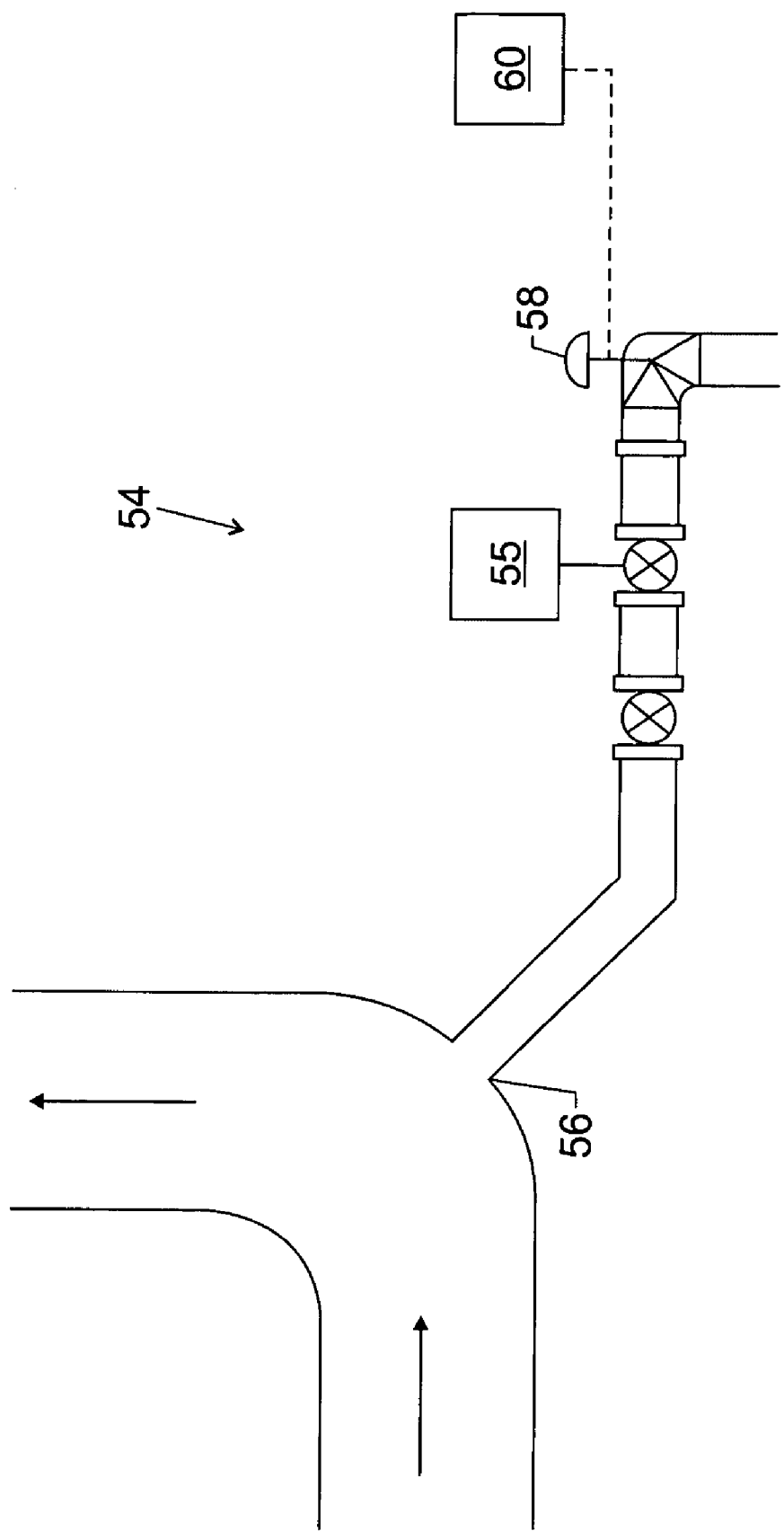
FIG. 2 is a cross section along line 2—2 of FIG. 1 showing a product take-off assembly that does not include a slurry concentrator but discharges slurry in a discontinuous manner.

As shown in FIG. 2, the withdrawn slurry take-off system includes a take-off assembly 54, which includes a take-off valve 58. The take-off assembly 54 is at the downstream end of a lower horizontal segment of the loop reactor. The location can be in an area near the last point in the loop where flow turns upward before the catalyst introduction point so as to allow fresh catalyst the maximum possible time in the reactor before it first passes a take-off point. However, the take-off assembly can be located on any segment or any elbow. The take-off assembly may, but does not have to, include an emergency shut off valve 55 as shown in FIG. 2.

Typically, the take-off assembly includes a pipe usually the same diameter or nearly the same diameter as the flashline 36 downstream of the take-off valve. Alternatively, the take-off assembly may include other apparatus known in the art for removing fluid from a reactor. The pipe connects to an opening in the reactor 56 and removes a portion of the fluid slurry. Also, the segment of the reactor to which the take-off assembly is attached can be of larger diameter to slow down the flow and hence further allow stratification of the flow so that the withdrawn slurry can have an even greater concentration of solids. Such stratification in the reactor does not comprise a "slurry concentrator", which is defined herein as an apparatus additional to the reactor whose primary function is to increase the solids concentration of the slurry being withdrawn. The opening 56 may be located at or adjacent the downward curvature of a reactor elbow so as to take advantage of the centripetal force to increase solids concentration.

The take-off assembly 54 is downstream of the reactor 10 but upstream of the polymer recovery system or flashline 36. The take-off valve 58 can be any type of control valve known in the art to be useful for controlling polymer slurry flow. Such valves include ball valves, v-ball valves, plug valves, globe valves and angle valves. The preferred valves have few or no places for solids to attaché and build up and have an opening greater than the largest expected polymer particle size even when the valve is required to be only a small amount open (for example, 20–25% open). This gives a wide control range for the valve (20–100% open).

A large variety of control configurations may be utilized to accomplish the purpose of this invention. For the on/off control system, a take-off valve may be actuated by a signal from a controller 60 to operate in a discontinuous manner. The controller may be configured to fully close and then fully open the take-off valve 58 at set intervals and for a certain duration.

For a repetitive pattern control system, a take-off valve 58 is actuated by the controller 60 according to a particular control signal that is usually some type of repetitive or pattern repeating function. One example of such a repeating function is a sign wave. In such a process, the control system could be tuned to put the valve at its full open position at the wave peak and at its most restricting position (lowest flow rate) at the wave bottom. With such a system, larger particle agglomerates or particles can pass through the valve during the peak of the sine wave while reactor pressure control and less flow is maintained during the low part of the sine wave. The throttle pattern also creates localized pressure pulses and ensures that the valve will experience good throughput on a regular basis, thereby providing regular opportunities to pass larger particles or agglomerates of polymer as in the close/open control figuration previously described. The amplitude and frequency of the sine wave signal can be tuned to give desirable operating conditions like steady reactor pressure and the size of the polymer particles or agglomerates that can be passed through the take-off valve. The advantages of the on/off control system and the repetitive pattern system may be combined by configuring the repetitive pattern system such that the take-off valve is fully closed at the low portion of the sine wave signal.

The repetitive pattern signal is not limited to a sine wave function, but may be any type of pattern or function that allows for throttling in a repetitive pattern such that the take-off valve will experience desired throughput on a regular basis, thereby providing regular opportunities to pass larger particles or agglomerates of polymer as in the close/open control system previously described.

Returning to FIG. 1, the withdrawn slurry is passed via conduit 36 to a polymer recovery system that is known in the art. Withdrawn slurry is passed into high-pressure flash chamber 38. Prior to entering the chamber the withdrawn slurry may be heated by flashline heater 40. Vaporized diluent exits the flash chamber via line 42 for further processing which includes condensation by simple heat exchange using recycle condenser 50, and return to the system, without the necessity for compression, via recycle diluent line 30. Polymer particles are withdrawn from high-pressure flash chamber 38 via line 44 for further processing using techniques for preparing the polymer as finished product. Preferably they are passed to low-pressure flash chamber 46 and thereafter recovered as polymer product via line 48. Separated diluent passes through compressor 47 to line 42.

Figure 3A:
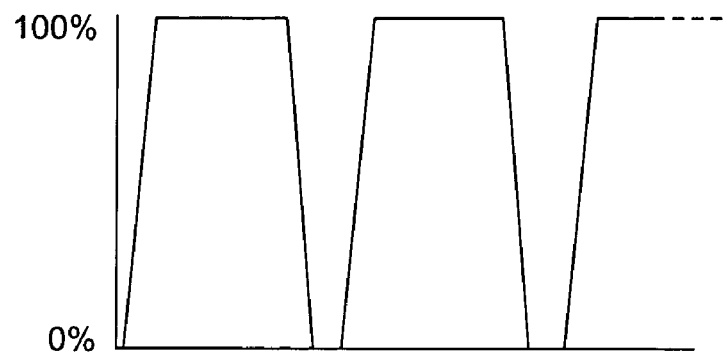
FIGS. 3(a) through 3(c) show three variations of repetitive patterns of opening and closing a take-off valve.
Figure 3B:
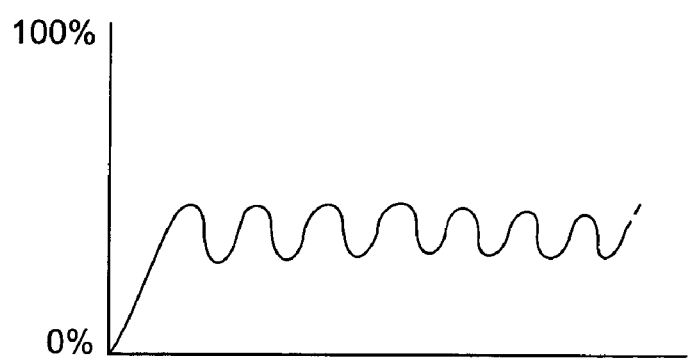
Figure 3C:
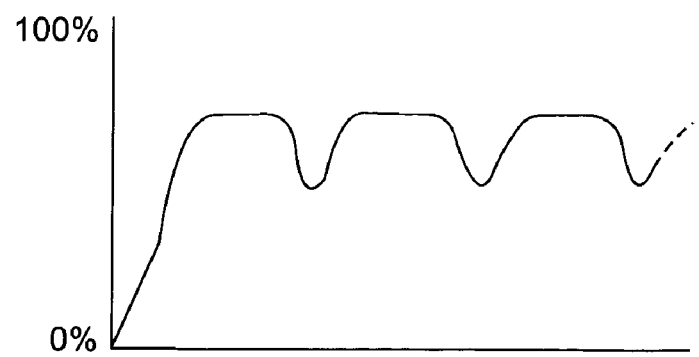

FIGS. 3(a) through 3(c) show three variations of repetitive patterns of opening and closing a take off valve. In the three graphs shown in FIGS. 3(a) through 3(c), the x-axis is time and the y-axis is the take off valve's degree of openness. "100%" is the top of the y-axis and means that the valve is fully opened, while "0%" is the bottom of the y-axis and means that the valve is fully closed.

FIG. 3(a) depicts a repetitive pattern of opening and fully closing the take-off valve, so that the withdrawn slurry is removed discontinuously. The valve is opened to 100% and a maximum amount of fluid slurry is withdrawn through the take off valve. Alternatively, the valve may be opened to less than 100%. After a first time period, a controller sends a signal that results in the take off valve being fully closed (in other words, the percentage of valve opening is 0%). The valve is fully closed for a second time period. During this second period, there is no fluid slurry withdrawn through this take off valve (though fluid slurry may be withdrawn through other take offs during the second period, which is usually shorter than the first period. Since there is a complete stopping of the withdrawal of fluid slurry during this period, this repetitive pattern is considered a discontinuous take off pattern. After the second time period, the take off valve is opened again, thereby beginning a second cycle like the cycle just described. The open/close cycle is repeated during reactor operation to form a repetitive pattern.

FIG. 3(b) depicts an opening and closing the take-off valve in a sine wave pattern. The valve is opened to a peak opening percentage, for example 60%. After the valve opening reaches its peak, it begins a somewhat gradual closing until it reaches a trough opening percentage, for example 40%. (The trough is the low point of the sine wave pattern.) Then the valve is somewhat gradually opened until it reaches the peak opening percentage again. This sequence is repeated, and the opening percentage may be plotted over time with the result that a sine wave pattern is shown by the plot. The sine wave pattern of opening and closing the take off valve is used during reactor operation and forms a repetitive pattern.

Alternatively, the top and bottom of the sine wave do not have to be uniform. Indeed, it may be preferable to employ a modified sine wave pattern. For example, the time for which the valve is at the peak opening percentage may be extended, so that a larger amount of fluid slurry is withdrawn for a longer period of time. Additionally or alternatively, the time for which the valve is at the trough opening percentage may be reduced, so that take off is stopped for a shorter period of time. However it is desirable that the trough opening percentage be maintained for a sufficient time to generate a localized pressure pulse sufficient to dislodge accumulated polymer at the valve opening.

FIG. 3(c) depicts opening and closing the take off valve in a modified sine wave pattern, so that localized pressure pulses are created at the take off valve. The valve is opened to a peak opening percentage, for example 40%. After the valve opening reaches its peak, it remains at that peak opening percentage for a predetermined time, and then begins a somewhat gradual closing until it reaches a trough opening percentage, for example 10%. Then the valve is somewhat gradually opened until it reaches the peak opening percentage again. This sequence is repeated, and the opening percentage may be plotted over time with the result that a modified sine wave pattern is shown by the plot. The sine wave pattern of opening and closing the take off valve is used during reactor operation and forms a repetitive pattern.

Figure 4:
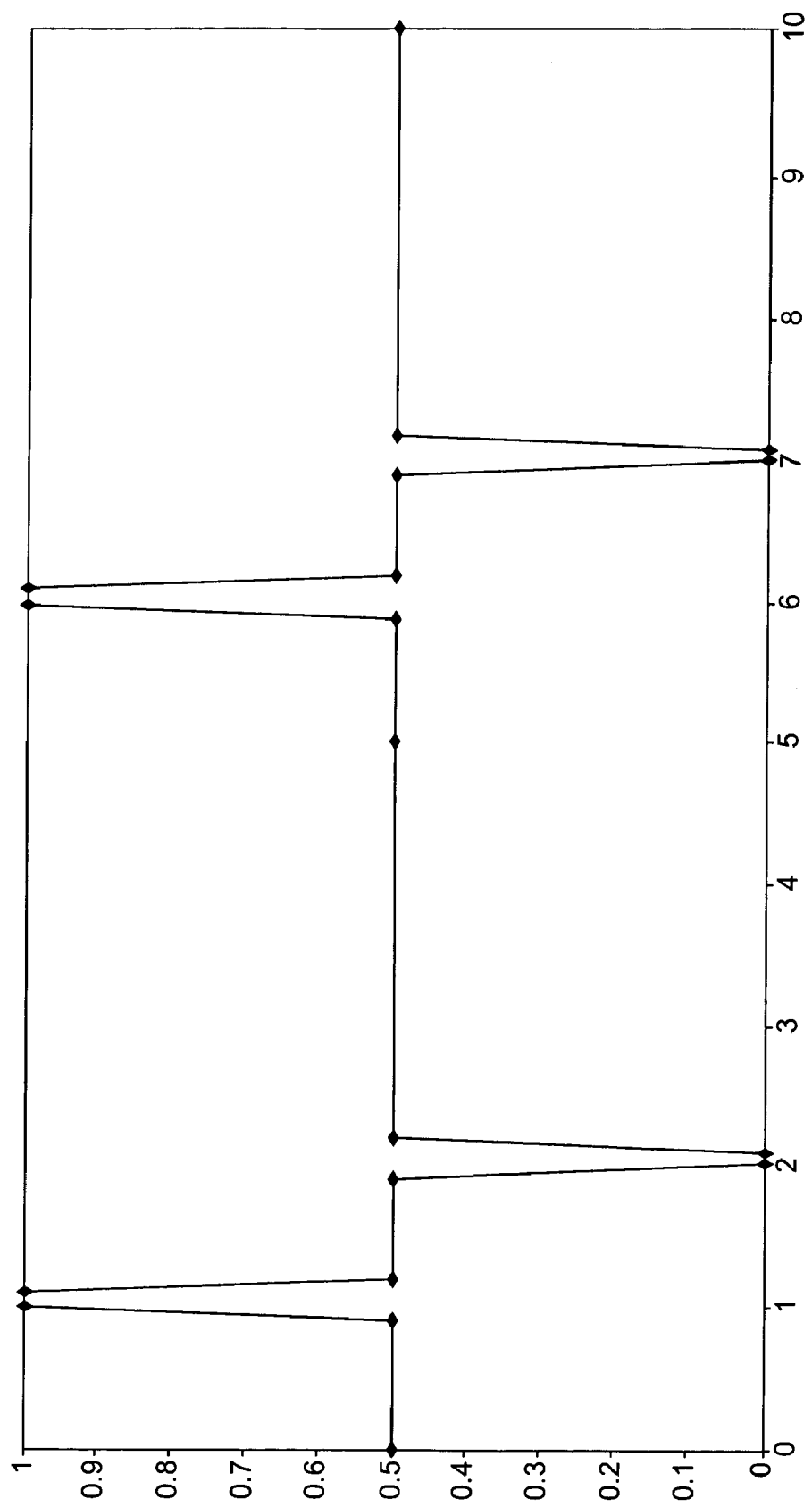
FIG. 4 shows another pattern of opening and closing a take-off valve.

FIG. 4 depicts fully opening and fully closing the take-off valve in a repetitive pattern. In the graph shown in FIG. 4, the x-axis is time and the y-axis is the take off valve's degree of openness, expressed as the fraction at which the take-off valve is open. "1.0" is the top of the y-axis and means that the valve is fully opened, while "0" is the bottom of the y-axis and means that the valve is fully closed. In this pattern, take-off valve is usually 50% open (the openness fraction is 0.5), but at set times, the valve is fully opened, i.e., the valve is opened to 100%, for a relatively brief time period. For example, for a pattern as shown in FIG. 4 having a cycle time of 5 seconds, the valve is fully opened for $1/10$ second, after which it returns to its baseline openness fraction. A short period later, the valve is fully closed for $1/10$ second, after which it returns to its baseline openness fraction. The baseline openness may be adjusted based on operating conditions. The opening and/or closing may be from about 0.001 second to about 100 seconds, alternatively from about 0.01 second to about 10 seconds, alternatively $1/20$ second to $1/5$ second. This repetitive pattern is advantageous in that the slurry is usually withdrawn at a steady rate, but the advantages of localized pressure pulses are periodically employed to dislodge or deform potential polymer plugs so that they may pass more easily.

Reactor pressure could be controlled by adjusting the baseline operating valve openness (shown in FIG. 4 as 0.5 open fraction, or 50%) as it could be any openness fraction from above 0 to 1.0 Alternatively, reactor pressure could be controlled by the relative length of the time periods for which the valve is fully opened or fully closed.

The present invention need not be used through the entire polymerization run. Indeed, it is contemplated that the present invention may be used for a relatively short portion of the polymerization run. Another take off technique may be used for a remainder of the polymerization run. For example, it may be desirable to use a continuous take off technique is used for most of the polymerization run, but to occasionally or periodically employ the discontinuous take off pattern of FIG. 3(a) in order to clean the take off valve.

While this invention has been described in detail for the purpose of illustration, it is not to be construed as limited thereby, but is intended to cover all changes within the spirit and scope thereof.

The invention claimed is:

1. A polymerization process comprising:
   polymerizing in a loop reaction zone, at least one olefin monomer to produce a fluid slurry comprising a liquid medium and solid olefin polymer particles;
   maintaining a concentration of the solid olefin polymer particles in the fluid slurry in the reaction zone of greater than 40 weight percent based on the weight of the solid olefin polymer particles and the weight of the liquid medium;
   withdrawing, through a take-off valve, a portion of the fluid slurry as withdrawn slurry; and
   repetitively fully closing and opening the take-off valve at set intervals, such that the withdrawn slurry is removed from the reactor discontinuously;
   wherein the take-off valve is not located in a settling leg.

2. A process according to claim 1 wherein the take-off valve comprises a ball valve.

3. A process according to claim 1 wherein the reaction zone has a volume of greater than 20,000 gallons.

4. A process according to claim 1 wherein the reaction zone has a volume of greater than 30,000 gallons.

5. A process according to claim 1 wherein the reaction zone has a volume of greater than 35,000 gallons.

6. A process according to claim 1 wherein the take-off valve is fully opened at set intervals.

7. A process according to claim 1 wherein the take-off valve is operated at a baseline openness of from about 20% to about 60%, and said take-off valve periodically fully opens and fully closes.

8. A polymerization process comprising:
   polymerizing in a loop reaction zone, at least one olefin monomer to produce a fluid slurry comprising a liquid medium and solid olefin polymer particles;
   withdrawing, through a take-off valve, a portion of the fluid sluny as withdrawn slurry; and
   repetitively fully closing and opening the take-off valve at set intervals, such that the withdrawn slurry is removed from the reactor discontinuously;
   wherein the take-off valve is not located in a settling leg and wherein the take-off valve operates at a baseline of about 20% open to about 60% open, and periodically fully opens and fully closes.

9. A process according to claim 1 wherein the set intervals for repetitively fully closing and opening the take-off valve extend through substantially all of the polymerizing step.

10. A polymerization process comprising:
    polymerizing in a loop reaction zone, at least one olefin monomer to produce a fluid slurry comprising a liquid medium and solid olefin polymer particles;
    maintaining a concentration of the solid olefin polymer particles in the fluid slurry in the reaction zone of greater than 40 weight percent based on the weight of the olefin polymer particles and the weight of the liquid medium;
    withdrawing, through a take-off valve, a portion of the fluid slurry as withdrawn slurry; and
    closing and opening the take-off valve in a repetitive pattern.

11. A process according to claim 10 wherein the closing and opening comprises closing and opening the take-off valve in a sine wave pattern.

12. A process according to claim 10 wherein the closing and opening in a repetitive pattern comprises closing and opening the take-off valve in a modified sine wave pattern.

13. A process according to claim 12, wherein the modified sine wave pattern has a peak and a trough, and the take-off valve is fully closed at the trough of the modified sine wave pattern.

14. A process according to claim 13 wherein the take-off valve is fully open at the peak of the modified sine wave pattern.

15. A process according to claim 10 wherein the take-off valve is a ball valve.

16. A process according to claim 10 wherein the reaction zone has a volume of greater than 20,000 gallons.

17. A process according to claim 10 wherein the reaction zone has a volume of greater than 30,000 gallons.

18. A process according to claim 10 wherein the reaction zone has a volume of greater than 35,000 gallons.

* * * * *